(12) United States Patent
Moon et al.

(10) Patent No.: US 10,901,539 B2
(45) Date of Patent: Jan. 26, 2021

(54) INPUT MODULES ASSOCIATED WITH MULTIPLE INPUT INTERFACES

(71) Applicant: HEWLETT-PACKARD DEVELOPMENT COMPANY, L.P., Houston, TX (US)

(72) Inventors: Tony Moon, Houston, TX (US); Ricky Thomas Burks, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/089,107

(22) PCT Filed: Feb. 15, 2017

(86) PCT No.: PCT/US2017/017868
§ 371 (c)(1),
(2) Date: Sep. 27, 2018

(87) PCT Pub. No.: WO2018/151710
PCT Pub. Date: Aug. 23, 2018

(65) Prior Publication Data
US 2020/0301519 A1 Sep. 24, 2020

(51) Int. Cl.
G06F 3/038 (2013.01)
G06F 3/0354 (2013.01)
G06F 3/02 (2006.01)

(52) U.S. Cl.
CPC ............ *G06F 3/038* (2013.01); *G06F 3/0202* (2013.01); *G06F 3/03547* (2013.01)

(58) Field of Classification Search
None
See application file for complete search history.

(56) References Cited

U.S. PATENT DOCUMENTS

| | | | | |
|---|---|---|---|---|
| 5,422,784 A | * | 6/1995 | Wakahara | G06F 1/1616 361/679.02 |
| 6,292,361 B1 | | 9/2001 | Johnson et al. | |
| 6,307,736 B1 | * | 10/2001 | Song | G06F 1/1616 361/679.09 |
| 8,309,870 B2 | | 11/2012 | Peterson et al. | |
| 8,681,096 B2 | | 3/2014 | Stewart et al. | |
| 8,803,806 B2 | | 8/2014 | Mundt et al. | |
| 2001/0011998 A1 | * | 8/2001 | Agata | G06F 1/169 345/168 |
| 2001/0029128 A1 | * | 10/2001 | Horiuchi | H01R 13/6315 439/578 |
| 2005/0078464 A1 | * | 4/2005 | Hickey | G06F 1/1616 361/790 |
| 2006/0025090 A1 | | 2/2006 | Shirakata et al. | |

(Continued)

OTHER PUBLICATIONS

"ClickPad—Product Brief", Synaptics, Retrieved from Internet: http://www.synaptics.com/sites/default/files/clickpad-product-brief.pdf, May 24, 2016, 1 page.

(Continued)

*Primary Examiner* — Dorothy Harris
(74) *Attorney, Agent, or Firm* — Trop, Pruner & Hu P.C.

(57) ABSTRACT

An example apparatus includes a circuit substrate and a clickpad that is mounted to the circuit substrate. The apparatus includes an input device other than the clickpad, which is mounted to the circuit substrate.

20 Claims, 5 Drawing Sheets

(56) References Cited

U.S. PATENT DOCUMENTS

| | | | |
|---|---|---|---|
| 2006/0201792 A1* | 9/2006 | Sun | G06F 1/1616 |
| | | | 200/5 A |
| 2008/0174951 A1* | 7/2008 | Mundt | G06F 1/1662 |
| | | | 361/679.41 |
| 2014/0078055 A1 | 3/2014 | Valentine et al. | |
| 2014/0364178 A1* | 12/2014 | Hynecek | H04M 1/0202 |
| | | | 455/575.8 |
| 2015/0041289 A1* | 2/2015 | Ely | G06F 1/163 |
| | | | 200/4 |
| 2016/0147328 A1 | 5/2016 | Doi et al. | |

OTHER PUBLICATIONS

"Libinput 1.5.0", Retrieved from Internet: https://wayland.freedesktop.org/libinput/doc/latest/touchpads.html, 2018, 5 pages.

* cited by examiner

INPUT MODULES ASSOCIATED WITH MULTIPLE INPUT INTERFACES

BACKGROUND

A computing device may have multiple input interfaces that may be operated by a user to provide mouse-type input, such as a touchpad interface and a pointing stick interface.

The touchpad interface may include a touch-sensitive surface for purposes of sensing finger taps and finger motions to allow a user to provide input similar to the input that may be provided through the motion of a mouse, such as, for example, input to drag an object, move a cursor, and so forth.

The pointing stick interface may include a joystick that may be embedded within the computing device's keyboard and may be selectively tilted by a user to provide input similar to input that may be provided through the motion of a mouse.

DETAILED DESCRIPTION

Figure 1:
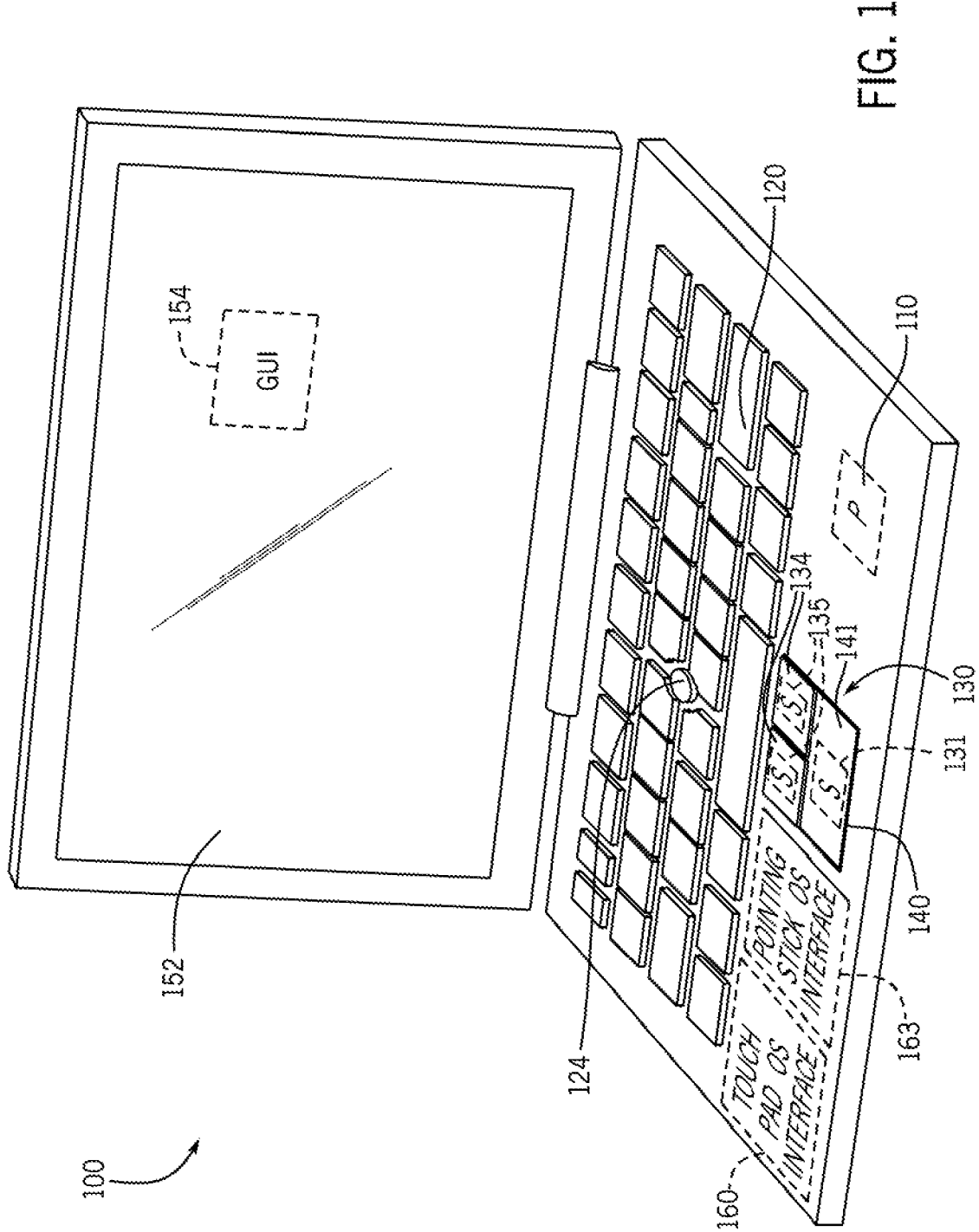
FIG. 1 is a perspective view of a computing device according to an example implementation.

Manufacturing a portable computing device (a notebook computer, for example) may involve mounting various physical input modules to the chassis or motherboard of the device and connecting cables of these devices to corresponding motherboard connectors. In this context, an "input module," refers to a physical unit, or component, that may have one or multiple of the following properties. The input device module may be associated with a particular input interface for the computing device, such as a mouse, pointing stick, or touchpad interface. The input module may contain one or multiple physical user interface devices (e.g., a touch sensitive surface, a mechanical button, a joystick, and so forth) that allow the user to provide input through physical interaction with the physical user interface device(s). The input module may have a physical communication interface (e.g., an optical interface, a wireless interface, an electrical interface and so forth) that communicates one or multiple signals (e.g., digital signals, analog signals, optical signals, and forth) that represent user input acquired due the physical interaction of the user with the physical user interface device(s) of the input module.

An "input interface" refers to hardware and machine executable instructions (of "software") of the computing device, which are associated with a particular category, or classification, of user input. As examples, the computing device may have such input interfaces as a camera interface, a pointing stick interface, a touchpad interface, a keyboard interface, a mouse interface, and so forth. As a more specific example, the pointing stick interface may be associated with one or multiple pointing stick input modules, i.e., hardware that provides one or multiple physical user interface devices, such as a joystick and one or multiple pointing stick buttons. The hardware may also include, for example, circuitry of the pointing stick input modules, which converts, or transforms, user operation of the joystick and button(s) into input data and communicates this data with other components of the computing device. The pointing stick interface may be associated with such machine executable instructions, or software, as a touchpad-based operating system interface and a device driver.

Some input modules may be adjacent to each other in the assembled computing device, and this arrangement may present challenges when assembling the computing device during the device's manufacture. For example, a computing device may contain a pointing stick interface and a touchpad interface. The touchpad interface may be associated with an input module that contains a touch/sensitive surface, and the pointing stick interface may be associated with an input module that contains physical pointing stick buttons. These two input modules may be mounted adjacent to each other on the computing device's motherboard so that the associated touch sensitive surface and pointing stick buttons protrude through a window, or opening, of the computing device's housing. It may be challenging to properly align these two input modules during the assembly of the computing device, and misalignment may result in quality-related issues. For example, misalignment may result in interference between the housing and a pointing stick button, interference between the housing and the touch sensitive structure, interference between a touchpad button and the housing, interference with operations of both input modules, and so forth.

In accordance with example implementations that are described herein, an electronic device contains an input module that is associated with multiple input interfaces and contains physical user interface devices that are associated with these input interfaces. Due to the integration of these physical interfaces into a single input module, the associated costs of the electronic device may be reduced, the integration complexity may be reduced, and the overall quality and reliability of the electronic device may be enhanced.

In accordance with example implementations, the electronic device may be a computing device, and the input module may be associated with both a pointing stick interface and a touchpad interface. In accordance with example implementations, the input module may contain a touch sensitive surface, or touchpad, and one or multiple pointing stick buttons. As a more specific example, in accordance with example implementations, the input module includes a click pad (i.e., a combination touch sensitive surface and physical button that is associated with a touchpad interface) and a pair of physical pointing stick buttons (associated with a pointing stick interface).

In accordance with some implementations, the electronic device may be a processor-based device, such as a portable, or notebook, computer 100 that is depicted in FIG. 1. In general, the systems and techniques that are described herein may be applied to any electronic device, whether or not the device is processor-based or not. Moreover, depending on the particular implementation, the electronic device may be a portable or a non-portable device, such as a tablet computer, a notebook computer, a smartphone, a desktop computer, a server, a client, a thin client, as well as other processor-based devices.

The computer 100, in accordance with example implementations, contains multiple input interfaces, such as a keyboard interface (associated with a keyboard 120 and keyboard operating system interface), a pointing stick interface (associated with pointing stick buttons 134, a pointing stick 124 and a pointing stick operating system interface 163); and a touchpad interface (associated with a click pad 140 and a touchpad operating system interface 160). Input that is acquired using the computer's input interfaces may be processed by a processor 110 of the computer 100 and may be used, in general, to control operations of the computer 100. In this manner, input acquired using the input interfaces may be used to control selections of elements of a graphical user interface (GUI) 154 that is displayed on a display 152 of the computer 100, control a cursor position, select files, control copying operations, open windows, draw images, close windows, and so forth. In this context, the "processor" may refer to one or multiple central processing units (CPUs), one or multiple CPU cores, and so forth.

In accordance with example implementations, the computer 100 contains an input module 130 that is associated with multiple input interfaces: the touchpad interface and the pointing stick interface. More specifically, in accordance with example implementations, the input module 130 includes the click pad 140 and the pointing stick buttons 134. Although a single input module that is associated with multiple input interfaces is described herein, the computer 100 may contain multiple such input modules, in accordance with further implementations. Moreover, in accordance with further implementations, a given input module may be associated with more than two input interfaces; and in accordance with yet further implementations, an input module may be associated with multiple input interfaces, which do not include a touchpad interface and/or a pointing stick interface.

As depicted in FIG. 1, the click pad 140 may include a touch sensitive surface 141 that is constructed to sense touch-related physical interaction with the surface 141 (finger contact, finger swipes, and so forth) so that circuitry of the input module 130 may generate one or multiple data signals representing the physical interaction. As an example, in accordance with example implementations, the input module 130 may contain one or multiple capacitive sensors to sense the touch-related physical interaction. The touch sensitive surface 141 may serve a dual function as being the contact surface for a mechanical movement-based switch 131 of the touchpad interface. In this manner, in accordance with example implementations, a user may selectively depress and release the touch-sensitive surface 141 to change the state of the switch 131 (change the state from an open state to a closed state, for example).

Each pointing stick button 134, in accordance with example implementations, may be associated with a mechanical movement-based switch 135. In this manner, a user may selectively depress and release the button 134 to change the state of the associated switch 135.

Figure 2A:
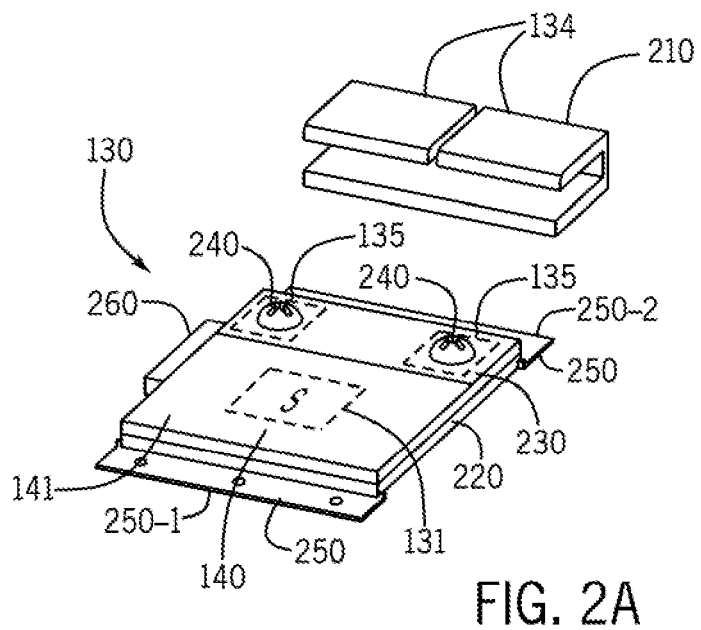
FIG. 2A is an exploded perspective view of an input module of the computing device of FIG. 1 according to an example implementation.

Referring to FIG. 2A, in accordance with example implementations, the click pad 140 and pointing stick buttons 134 may be mounted to a printed circuit board (PCB) substrate 220 of the user input module 130. In this context, the click pad 140 being "mounted on" the substrate 220 refers to the click pad 140 being mechanically and electrically coupled to the substrate 220. Moreover, as depicted in FIG. 2A, in accordance with example implementations, the switches 135 for the pointing stick buttons 134 may be tactile switches that are formed by corresponding metallic tactile domes 240. In this manner, the tactile domes 240 may be mounted to the PCB substrate 220, and are associated with the buttons 134.

As depicted in FIG. 2A, the buttons 134 may be formed by an integral button overlay 210, which is partially bifurcated to allow independent movements of the buttons 134. The buttons 134 extend over respective tactile domes 240. Therefore, when a button 134 is depressed, the button 134 correspondingly depresses its associated tactile dome 240. The tactile dome 240, may be electrically coupled to a first switch terminal and extend over a second switch terminal so that that when the associated button 134 is not depressed, the associated switch 135 is placed in one state (an open state, for example), and when the associated button 135 is pressed downwardly and contacts the second terminal, the associated switch 135 is placed in another state (a closed state, for example). In accordance with some implementations, the resiliency of the dome 240 provides a restoring force to cause the button 134 to rebound to a predetermined state when the button 134 is released.

In accordance with example implementations, the PCB substrate 220 includes circuit traces that communicate signals associated with the operations of the pointing stick buttons 134 and the click pad 140 to a cable connector 260, which may be disposed, for example, on an edge of the PCB substrate 220. In accordance with some implementations, circuitry to support the click pad 140 and/or pointing stick buttons 135 may be mounted to the PCB substrate 220. For example, the circuitry may include circuitry to convert signals that are provided by the switches 135 into data signals that are communicated through electrically conductive members (wires, for example) of the cable connector 260 to a motherboard of the computer 100, circuitry to convert signals that are provided by the click pad 140 into data signals that are communicated via the cable connector 260 to the motherboard, and so forth.

Figure 2B:
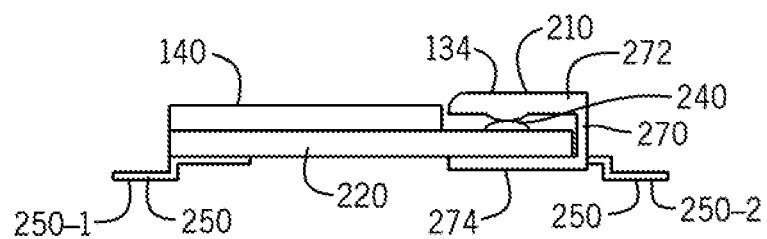
FIG. 2B is a side view of the input module according to an example implementation.

As also depicted in FIG. 2A, in accordance with example implementations, the input module 130 may contain one or multiple mounting brackets 250 that are mounted to the lower side of the PCB 220 and to respective edges of the PCB 220, to secure the input module 130 to the motherboard of the computer 100. More specifically, referring to FIG. 2B, in accordance with example implementations, the mounting brackets 250 may include a mounting bracket 250-1, which is secured to the lower face of the PCB substrate 220 beneath the click pad 140 and a mounting bracket 250-2 that is secured to the lower face of the PCB substrate 220 between the tactile domes 240. Each bracket 250-1 and 250-2 may physically be secured to the motherboard using one or multiple fasteners (screws or threaded bolts and nuts, for example).

In accordance with some implementations, the mounting bracket 250-2 may also be mounted to the button overlay 210. In this manner, the button overlay 210, in accordance with example implementations, may have channel 270 that receives an edge of the PCB substrate 220 and is defined between upper 272 and lower 274 portions of the button overlay 210. The upper portion 272 of the button overlay 210 corresponds to the buttons 134 and overhangs the metal domes 240. The lower portion 274 of the button overlay 210 extends beneath the PCB substrate 220 and may be thermally bonded or insert molded with the mounting bracket 250-2, in accordance with example implementations.

Figure 3:
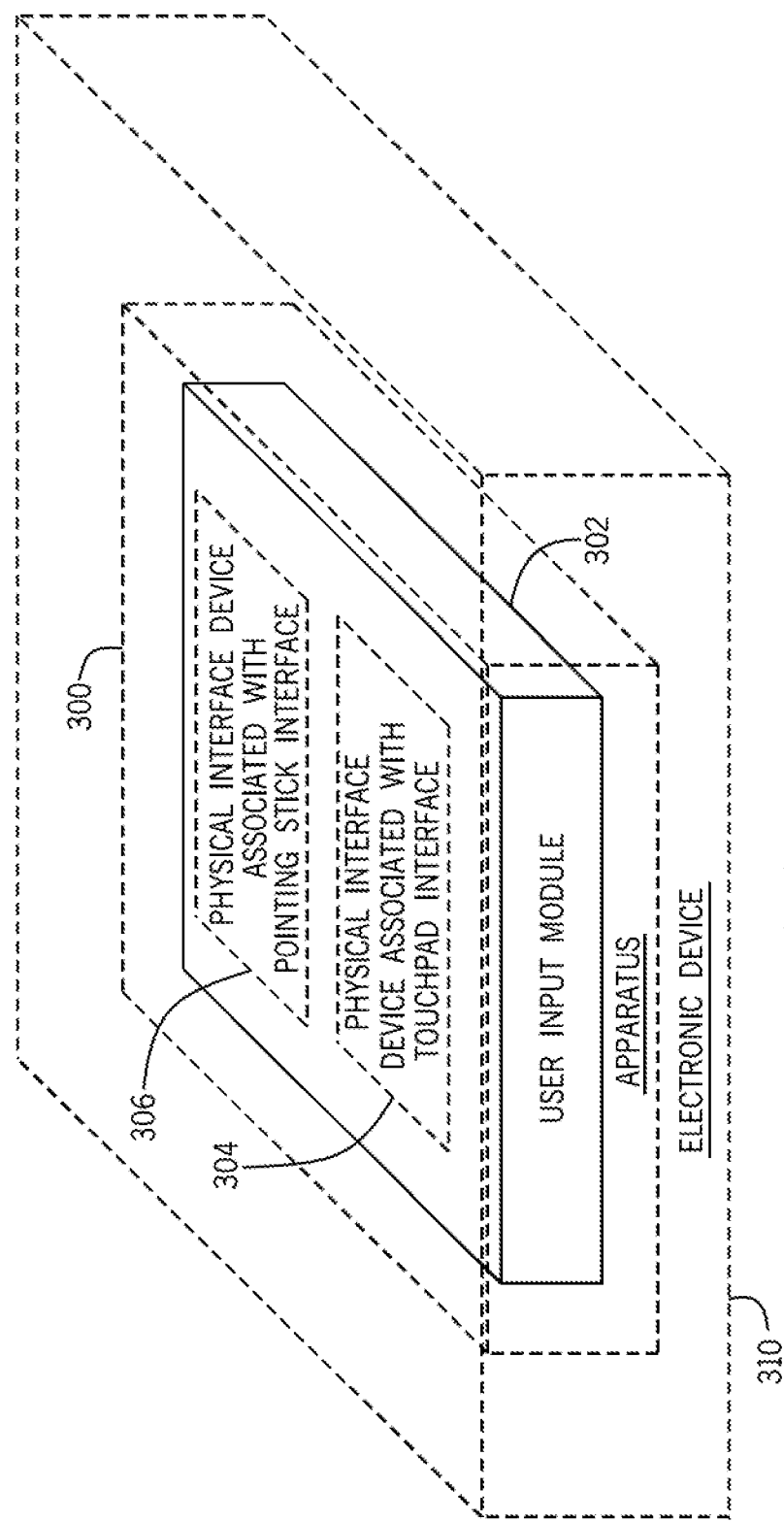
FIG. 3 is a schematic diagram of an apparatus that includes a user input module having physical touchpad and pointing stick interfaces according to an example implementation.

Thus, referring to FIG. 3, in accordance with example implementations, an apparatus 300 includes a user input module 302 that is to be mounted to an electronic device 310. The user input module 302 includes a first physical interface device that is associated with a touchpad interface 304 and a second physical interface device 306 that is associated with a pointing stick interface.

Figure 4:
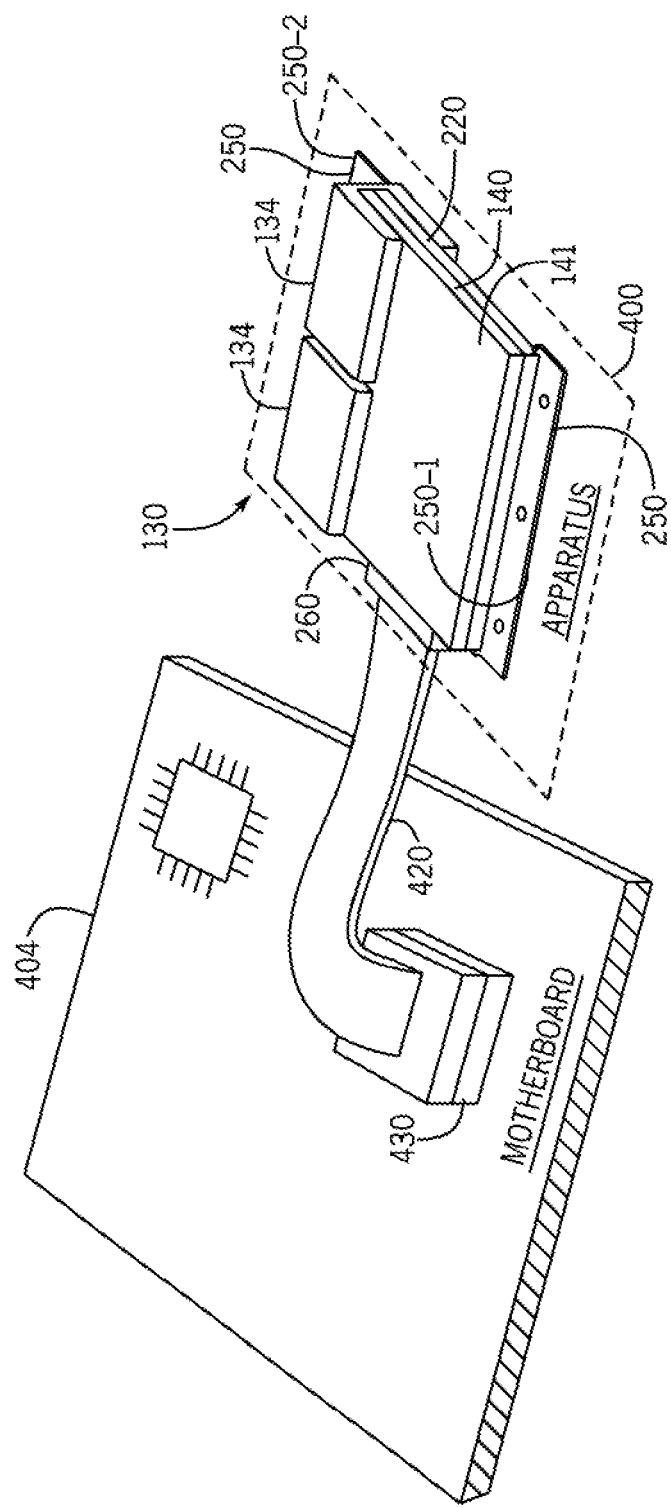
FIG. 4 is a schematic diagram of an apparatus having a touchpad and a pointing device according to an example implementation.

Referring to FIG. 4, in accordance with example implementations, an apparatus 400 includes a circuit substrate 220 and a click pad 140 that is mounted to the circuit substrate 220. The click pad 140 is associated with a first input interface (a touch pad interface, for example). The apparatus 400 includes an input device (a button-based input device, such as a pointing stick button 134, for example), which is mounted to the circuit substrate 220, and the input device is associated with a second input interface (a pointing stick interface, for example). The apparatus 400 includes an electrical connector 260 that is mounted to the circuit substrate 220 to electrically couple the click pad 140 and the input device to a computer motherboard 404 (electrically coupled by a cable 420, which is attached to the electrical connector 260 and a connector 430 on the motherboard 404, for example).

Figure 5:
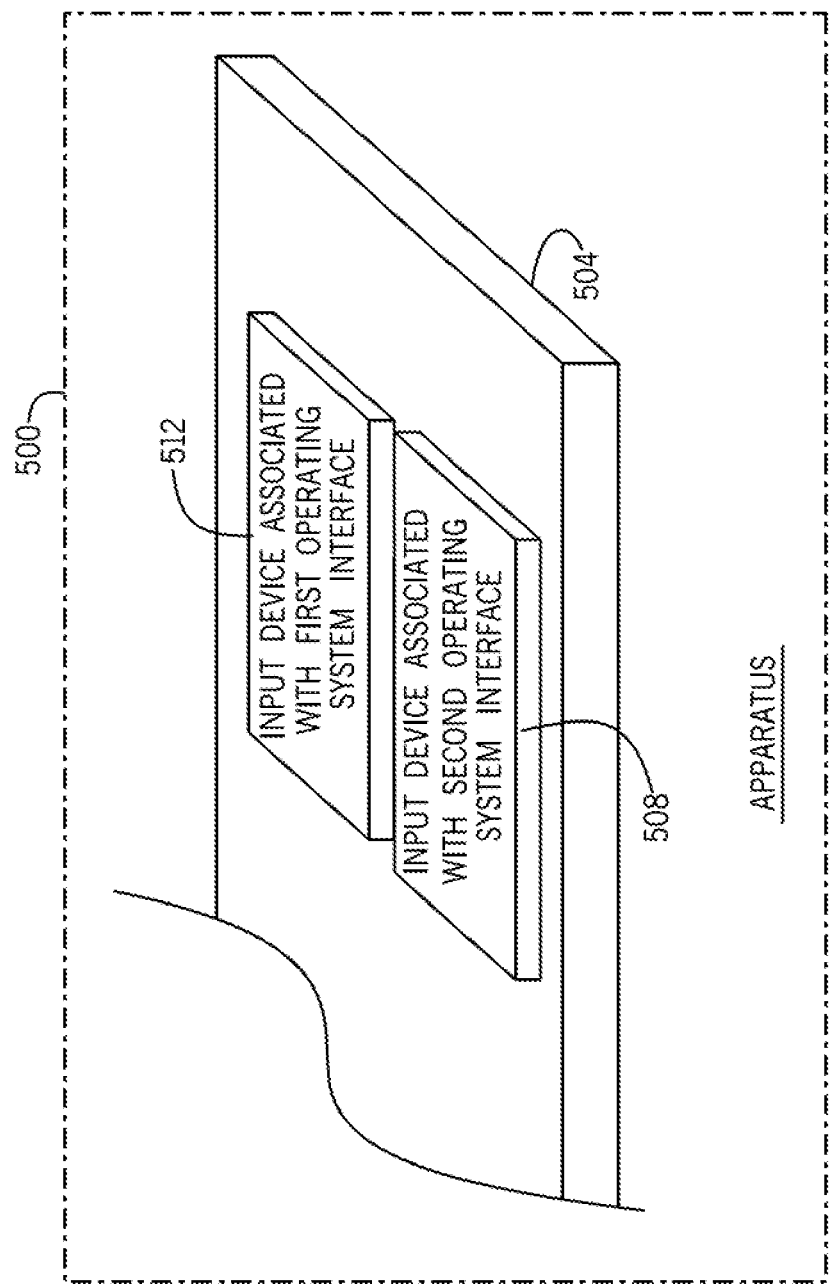
FIG. 5 is a schematic diagram of an apparatus that includes an input module associated with multiple input interfaces according to an example implementation.

Referring to FIG. 5, in accordance with example implementations, an apparatus 500 may include a circuit substrate 504; an input device 508 that is mounted to the circuit substrate 504 and associated with a first operating system interface; and an input device 508 that is mounted to the circuit substrate 504 and is associated with a second operating system interface.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
    a user input module to be mounted to a motherboard, the user input module comprising:
        a printed circuit board (PCB) substrate;
        a bracket to attach the PCB substrate to the motherboard;
        a touchpad mounted on the PCB substrate;
        a pointing stick button that is part of a pointing stick interface and is mounted on the PCB substrate; and
        a button overlay comprising the pointing stick button, the button overlay comprising a channel receiving an edge of the PCB substrate.

2. The apparatus of claim 1, wherein
the bracket is attached to an edge portion of the PCB substrate.

3. The apparatus of claim 1, wherein the button overlay is thermally bonded or insert molded onto the bracket.

4. The apparatus of claim 1, further comprising:
    a tactile switch;
    wherein:
        the tactile switch is mounted on the substrate, and
        the pointing stick button is cantilevered over the tactile switch.

5. The apparatus of claim 1, wherein:
the pointing stick button is associated with a first operating system interface, and
the touchpad is associated with a second operating system interface different from the first operating system interface.

6. The apparatus of claim 1, further comprising:
a cable attached to the PCB substrate, wherein the cable comprises conductive members to communicate signals representing an input acquired due to an operation of the pointing stick button and an input acquired due to an operation of the touchpad.

7. The apparatus of claim 1, wherein the user input module is a single user input module into which the PCB substrate, the touchpad, and the pointing stick button are integrated.

8. The apparatus of claim 1, further comprising a switch between the pointing stick button and the PCB substrate.

9. The apparatus of claim 8, further comprising a tactile dome over which the pointing stick button is provided, wherein an upper portion of the button overlay overhangs the tactile dome, and wherein the tactile dome is electrically coupled to the switch to activate the switch responsive to the tactile dome being depressed by a depression of the pointing stick button.

10. The apparatus of claim 9, wherein the tactile dome is mounted on the PCB substrate and is located in the channel.

11. An apparatus comprising:
    a circuit substrate;
    a click pad mounted on the circuit substrate, the click pad being associated with a first input interface;
    an input device comprising a button and mounted on the circuit substrate, the input device being associated with a second input interface;
    an electrical connector mounted on the circuit substrate to electrically couple the click pad and input device to a computer motherboard; and
    a button overlay comprising the button and a channel receiving an edge of the circuit substrate.

12. The apparatus of claim 11, wherein the input device further comprises:
    a tactile dome mounted on the circuit substrate, wherein the button is mounted over the tactile dome.

13. The apparatus of claim 12, further comprising a switch between the button and the circuit substrate, wherein an upper portion of the button overlay overhangs the tactile dome, and wherein the tactile dome is electrically coupled to the switch to activate the switch responsive to the tactile dome being depressed by a depression of the button.

14. The apparatus of claim 13, wherein the tactile dome is located in the channel.

15. The apparatus of claim 11, further comprising:
    a mounting bracket to mechanically attach the circuit substrate to the computer motherboard.

16. The apparatus of claim 11, wherein the input device is associated with a pointing stick, and the button is associated with the pointing stick.

17. The apparatus of claim 11, wherein the electrical connector comprises a cable connector.

18. An electronic device comprising:
    a motherboard; and
    a user input module comprising:
        a printed circuit board (PCB) substrate;
        a bracket attaching the PCB substrate to the motherboard,
        a touchpad mounted on the PCB substrate;
        a button mounted on the PCB substrate; and
        a button overlay comprising the button, the button overlay comprising a channel receiving an edge of the PCB substrate.

19. The electronic device of claim 18, wherein the button is a pointing stick button that is part of a pointing stick interface.

20. The electronic device of claim 18, wherein the user input module further comprises:

a switch between the button and the PCB substrate;
a tactile dome over which the button is provided, wherein an upper portion of the button overlay overhangs the tactile dome, wherein the tactile dome is electrically coupled to the switch to activate the switch responsive to the tactile dome being depressed by a depression of the button, and wherein the tactile dome is mounted on the PCB substrate and is located in the channel.

\* \* \* \* \*